United States Patent [19]

Thompson

[11] 4,343,858
[45] Aug. 10, 1982

[54] PIGMENTED COATED PAPERBOARD

[75] Inventor: Kenneth P. Thompson, Canton, N.C.

[73] Assignee: Champion International Corporation, Stamford, Conn.

[21] Appl. No.: 284,391

[22] Filed: Jul. 17, 1981

Related U.S. Application Data

[63] Continuation-in-part of Ser. No. 255,099, Apr. 17, 1981, abandoned.

[51] Int. Cl.³ .................... B32B 5/16; B32B 15/02; B32B 15/20; B32B 27/10
[52] U.S. Cl. .................... 428/342; 428/204; 428/207; 428/328; 428/458; 428/464; 428/483; 428/511; 428/514
[58] Field of Search ............... 428/204, 328, 329, 340, 428/341, 342, 458, 463, 464, 483, 514, 207, 323–327, 330, 331, 537, 698; D4/38.1, 38.2

[56] References Cited

U.S. PATENT DOCUMENTS

| | | | |
|---|---|---|---|
| 3,053,676 | 9/1962 | Higbee | 428/328 |
| 3,085,025 | 4/1963 | Eaton | 428/328 |
| 3,988,494 | 10/1976 | McAdow | 428/328 |

Primary Examiner—Bruce H. Hess
Attorney, Agent, or Firm—Evelyn M. Sommer

[57] ABSTRACT

A pigment-coated paperboard is provided which comprises a paperboard substrate on which there are coextruded a top film of polyethylene terephthalate and an intermediate layer of an acrylic ester copolymer containing from about ½ to about 15% pigment particles. Such coated paperboard is particularly suitable for use in containers for food, for book covers, expansion envelopes, business folders and the like. When the pigment is aluminum powder, trays made from the coated paperboard are suitable for use as disposable roller print trays.

11 Claims, No Drawings

PIGMENTED COATED PAPERBOARD

This application is a continuation-in-part of application Ser. No. 255,099 filed Apr. 17, 1981, now abandoned.

DETAILED DISCLOSURE

This invention relates to pigment-coated paperboard. More particularly, it relates to a paperboard on which there are coextruded a top film of polyethylene terephthalate and an intermediate layer of an acrylic ester copolymer, such as a copolymer of poly (ethyl methacrylate), containing particles of a pigment such as, in particular, $TiO_2$, aluminum, and the like.

Pigmentation of the top polyester film layer by usual master batch procedures is a difficult procedure and has economic disadvantages. By incorporating the pigment into the intermediate layer by a master batch technique, one obtains a suitable pigment-containing coated product in an economically more attractive manner. A principal advantage is that the pigmented layer is prepared as needed during the paperboard coating process. There is no need to maintain an inventory of pigmented polyester resins. A second advantage is that the adhesion characteristics of the polyethylene terephthalate film remain constant; there is no need to adjust the weight of film applied since there is no pigment in the film. Another advantage, which is applicable in a coextrusion process, is that the pigmented master batch is introduced into a smaller extruder, thus providing a more rapid facility for color changes.

The coated paperboard of this invention is suitable for a wide range of purposes such as for decorative use including book covers, business folders and, since the pigmented layer is not the surface layer, for use in food containers.

When the coated paperboard is metallic colored, it is especially useful for forming into disposable roller paint trays. The advent of easy-to-apply paints such as latex based paint applied with a roller, has caused a significant increase in interior and exterior painting by amateurs. The chief advantages of this type of paint and paint application lie in the ease of application and in low cost. Although the use of latex paint permits convenient clean-up by water rather than oil solvents, the use of disposable utensils would make the painting process even more convenient. Normally such paints are applied by dipping a roller into an aluminum pan whose dimensions are scaled to the size of the rollers in general use. The convenience of this type of application would be enhanced by the use of a disposable pan, i.e., one which is paper based. In order to gain consumer acceptance, however, it is believed that such a disposable pan must nevertheless have an aluminum color, at least on the interior surfaces thereof. At the same time, it is desirable that any aluminum used to obtain the aluminum color not be on the top surface layer, in order that the aluminum particles not be carried onto the roller and thus inadvertently applied to the surface to be painted.

This invention provides a pigmented coated paperboard material which can be easily manufactured into products such as book covers, food containers, aluminum-colored paint trays, or the like. The coated paperboard comprises a paperboard substrate, on which are co-extruded a top film of polyethylene terephthalate and, as an intermediate layer, an acrylic ester polymer containing from about ½ to about 15 weight percent, preferably from 1 to 10 weight percent and more preferably from 1-½ to 6 weight percent, of a pigment such as $TiO_2$ or aluminum particles.

The paperboard substrate can be any paperboard stock or web of sufficient thickness for its intended purpose. For containers, the thickness must be such that said containers will hold their shape when filled. Thicknesses ranging from about 0.14 inch to about 0.30 inch, are generally suitable for most purposes. For example, in a paint tray of about 19×14 inches, a suitable paperboard substrate is 0.027 inch milk carton stock. For other purposes such as decorative papers for use in making expansion envelopes, looseleaf binders, book covers and the like, a paper web of lesser thickness is more appropriate.

The polyethylene terephthalate film is a polyester film which is known in the art as being capable of extrusion onto a paperboard substrate. Preferably, the polyethylene terephthalate film can be applied in amounts ranging from about 8 to about 30 pounds per ream, with values of 10, 14, 21 and 28 pounds per ream being typical and 10 to 14 pounds being highly desirable.

The acrylic ester polymer intermediate layer comprises a polymer or copolymer of a lower alkyl ($C_1$ to $C_4$) ester of acrylic acid, methacrylic acid or ethacrylic acid. Particularly suitable is EMA, a copolymer comprising principally ethyl methacrylate units, applied in amounts ranging from about 3 to about 25 pounds per ream. Typical amounts for the intermediate layer are 3, 7, 14 and 20 pounds per ream.

Included in the acrylic ester polymer layer is from about ½ to about 15 weight percent of pigment particles. Aluminum is preferably used in the form of finely divided aluminum powder. The aluminum powder is most conveniently added to the acrylic polymer in the form of a 50% blend of a compatible polymer such as, for example, low-density polyethylene.

The $TiO_2$ can be used as is conventional in the plastic industry and is preferably employed in an amount of ½ to 15 weight percent and most preferably about ½ to 5 weight percent.

The polyethylene terephthalate top layer and the acrylic acid polymer intermediate layer containing the pigment are coextruded onto the paperboard substrate by methods well known in the art.

Although the coated paperboard of this invention is, with aluminum particles in the pigmented layer, particularly suitable for disposable paint trays, the coated paperboard can be pigmented with any color i.e., white, terra cotta, blue, yellow, so long as the pigment chosen has sufficient heat resistance to withstand the extrusion conditions. Typically, any suitably colored, heat resistant pigment can be employed, e.g., animal pigments, vegetable pigments; synthetic pigments; elemental pigments, e.g., carbon black or aluminum powder; inorganic pigments such as inorganic oxides, sulfides, hydroxides, carbonates, silicates, chromates, sulfates, arsenates and the like as well as organic pigments. An advantage to having the pigmented layer beneath a clear surface layer is that such coated papers have more "sparkle" than surface-pigmented papers. This is particularly beneficial in papers used for decorative purposes.

This invention will be better understood by reference to the following example, which is included for illustrative purposes only and is not to be construed as a limitation.

EXAMPLE I

A total of ten coextrusion trial runs were made under various process conditions. The substrate was 0.027 inch milk carton stock. The equipment used included a 4-½ inch Egan extruder and a 2-½ inch Egan extruder with a Cloeren adaptor, 36 inch EDI die and a gloss chill roll. The polyethylene terephthalate used was Goodyear ClearTuf #7202. The acrylic ester copolymer was poly(ethyl methacrylate)PE No. 2205 obtained from Gulf Oil Chemicals Company. The pigment was employed in a master batch consisting of 50% by weight aluminum powder blended with a low-density polyethylene.

The process conditions are set forth in the following Table in which the amounts of aluminum are expressed in terms of percent of the master batch. Thus, for example, "20% MB" indicates 10% of aluminum powder by weight of the poly(ethyl methacrylate) PE 2205.

TABLE

| | PROCESS CONDITIONS FOR COEXTRUSION TRIALS | | | | | | | | | |
|---|---|---|---|---|---|---|---|---|---|---|
| | Run 1 | Run 2 | Run 3 | Run 4 | Run 5 | Run 6 | Run 7 | Run 8 | Run 9 | Run 10 |
| "4½ Egan:" | | | | | | | | | | |
| Material Used | Goodyear PET | Goodyear PET | Goodyear PET | Goodyear PET | Goodyear PET | Goodyear PET | Goodyear PET | Goodyear PET | Goodyear PET | Goodyear PET |
| Melt Temp., °F. | 625 | 625 | 625 | 625 | 625 | 625 | 625 | 625 | 625 | 625 |
| RPM | 25 | 12 | 12 | 25 | 12 | 12 | 12 | 12 | 12 | 12 |
| Lbs/ream | 28 | 14 | 14 | 28 | 14 | 14 | 14 | 14 | 14 | 14 |
| "2½ Egan: | | | | | | | | | | |
| Material Used | PE 2205 | PE 2202 | PE 2205 + 20% MB | PE 2205 + 20% MB | PE 2205 + 10% MB | PE 2205 + 10% MB | PE 2205 + 5% MB | PE 2205 + 5% MB | PE 2205 + 5% MB | PE 2205 + 2½% MB |
| Melt Temp., °F. | 625 | 625 | 625 | 625 | 625 | 625 | 625 | 625 | 625 | 625 |
| RPM | 110 | 110 | 110 | 110 | 110 | 200 | 110 | 200 | 200 | 200 |
| Lbs/ream | 7 | 7 | 7 | 7 | 7 | 20 | 7 | 20 | 20 | 20 |
| Line Conditions: | | | | | | | | | | |
| Line Speed, fpm | 165 | 165 | 165 | 165 | 165 | 165 | 165 | 165 | 165 | 165 |
| Total Coating Weight, Lbs/ream | 35 | 21 | 21 | 35 | 21 | 34 | 21 | 34 | 34 | 34 |

Runs 1 and 2 were controls.

In Run 3, the aluminum pigment was introduced into a seven pound EMA layer, but the layer immediately began showing signs of numerous breakups, "fish eyes" in the coating; apparently, this resulted from an over-concentration of pigment agglomerations. By increasing the coating weight of the EMA to about 20 pounds per ream, the film again behaved as a continuous coating.

Similarly, in Run 4, the addition of aluminum pigment to the seven pound EMA layer resulted in "fish eyes", a condition which was "cured" by increasing the coating weight to about 20 pounds per ream.

In Run 5, "fish eyes" also occurred at the seven pound EMA level. This did not occur in Run 6, with 20 pounds per ream of EMA.

Run 7 gave less than satisfactory pigmentation. This was "cured" in Run 8 where additional EMA compensated for the low level of aluminum pigment.

Run 10, representing the lowest amount of aluminum pigment tested, resulted in a streaky layer of aluminum pigment, with the substrate showing through.

It is readily apparent from the foregoing data that suitable adjustments in the amount of aluminum powder and intermediate coating may be made within the ranges defined herein in order to obtain satisfactory, uniform pigmentation.

Roller paint trays are manufactured from the coated paperboard of the foregoing example so that the metallic coating is on the interior surface thereof. By suitable modification of the process described in the example, there can be prepared coated paperboard with metallic coating on both sides; roller paint trays manufactured from such paperboard will be aluminum colored on both the interior and exterior surfaces.

EXAMPLE 2

Employing the equipment described in Example 1, there were co-extruded onto a 0.0155 paperboard stock, Goodyear Clear Tux #7202 polyethylene terephthalate and poly(ethyl methacrylate) PE No. 2205 containing 10% by weight of $TiO_2$. The PET was applied in an amount of 10 lbs./ream; the PE 2205, in an amount of 7 lb./ream.

A coated white paperboard was obtained with deep glossy appearance, which was suitable for manufacture into trays or other containers.

EXAMPLE 3

Using the procedure a Example 1, there was prepared a yellow-pigmented paperboard sheet on 0.027 milk carton stock. The pigments were $TiO_2$ and benzidine yellow with a diazo orange, and were blended with a low density polyethylene to form a master batch. The pigment concentration in the PE 2205 was about 5%.

EXAMPLE 4

Example 2 was repeated using as the substrate 0.0195 milk carton stock. The PET was applied in an amount of 14 lbs./ream, the EMA in an amount of 7 lbs./ream. Substantially the same results were achieved.

What is claimed is:

1. A pigmented coated paperboard comprising a paperboard substrate on which are coextruded a top film of polyethylene terephthalate and an intermediate layer of a polymer or copolymer of a lower alkyl ($C_1$ to $C_4$) ester of acrylic acid, methacrylic acid or ethacrylic acid that contains from about ½ to about 15 weight percent of pigment.

2. A pigmented coated paperboard according to claim 1 in which the pigment is a member selected from the group consisting of inorganic pigments and organic pigments.

3. A pigmented coated paperboard according to claim 1 in which the pigment is aluminum particles.

4. A coated paperboard according to claim 3 in which the aluminum powder is blended with the acrylic ester copolymer in the form of a 50% suspension of aluminum powder in low-density polyethylene.

5. A coated paperboard according to claim 3 on which the top film and the intermediate layer are coextruded onto both sides of the said paperboard substrate.

6. A roller paint tray made from the coated paperboard of claim 3.

7. A coated paperboard according to claim 1 in which the intermediate layer contains from 1-½ to 6 weight percent of pigment particles.

8. A coated paperboard according to claim 1 in which the acrylic ester copolymer comprises poly(ethyl methacrylate).

9. A coated paperboard according to claim 8 in which the acrylic ester copolymer layer is applied in an amount ranging from about 3 to about 25 pounds per ream.

10. A coated paperboard according to claim 9 in which the polyethylene terephthalate film is applied in amounts ranging from about 10 to about 30 pounds per ream.

11. A coated paperboard according to claim 1 in which the pigment is $TiO_2$.

* * * * *